Dec. 12, 1967  G. FLEISSNER ET AL  3,357,111
MATERIAL GUARDING AND GUIDING MEANS FOR SIEVE DRUMS
Filed May 6, 1965  4 Sheets-Sheet 1

Inventors
GEROLD FLEISSNER
RICHARD WIEDERMANN
BY
McGlew & Toren
ATTORNEYS

Dec. 12, 1967  G. FLEISSNER ET AL  3,357,111
MATERIAL GUARDING AND GUIDING MEANS FOR SIEVE DRUMS
Filed May 6, 1965  4 Sheets-Sheet 2
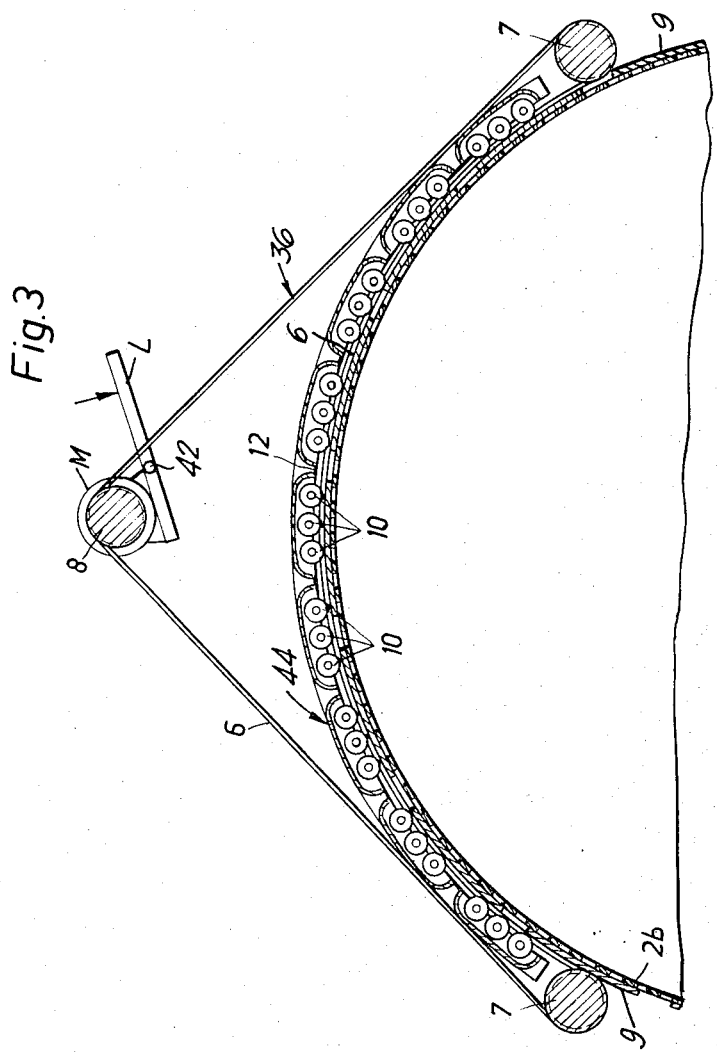
Inventors
GEROLD FLEISSNER
RICHARD WIEDERMANN
BY
ATTORNEYS

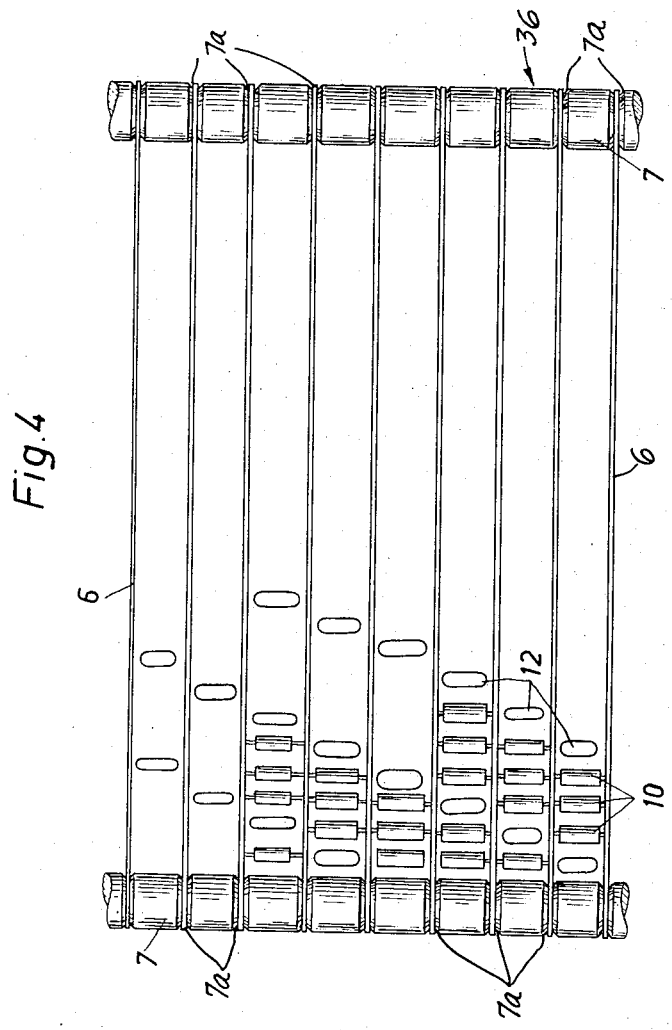

Dec. 12, 1967  G. FLEISSNER ET AL  3,357,111
MATERIAL GUARDING AND GUIDING MEANS FOR SIEVE DRUMS
Filed May 6, 1965  4 Sheets-Sheet 4

Inventors
GEROLD FLEISSNER
RICHARD WIEDERMANN
BY McGlew & Toren
ATTORNEYS

United States Patent Office 3,357,111
Patented Dec. 12, 1967

3,357,111
MATERIAL GUARDING AND GUIDING MEANS FOR SIEVE DRUMS
Gerold Fleissner and Richard Wiedermann, Frankfurt am Main, Germany, assignors to Fleissner G.m.b.H., near Frankfurt am Main, Germany
Filed May 6, 1965, Ser. No. 453,579
Claims priority, application Germany, May 20, 1964, F 42,929
8 Claims. (Cl. 34—115)

ABSTRACT OF THE DISCLOSURE

A device for treating a material such as a veneer which is air impermeable with a treatment fluid such as a drying air is disclosed. The apparatus includes a plurality of perforated drums or sieve drums over the surface of which the material to be treated is directed. The drums are provided with a fan for producing a suction within the drum interior and with interior baffles which are arranged in respect to drums in a row such that suction on the interior of the drum causes the adherence of the material to be dried over the surface thereof and the feeding successively to the next drum in the row which then suctionally engages the material and transfers it around a portion of its surface.

In accordance with the present invention, there are provided means for transporting material which is air impermeable around on the surface of the drums so that they can be freely contacted with the treatment fluid (i.e. drying air) while they are held in position adjacent the surface of the drum. The present invention is based on the discovery that such materials, particularly veneers, can be treated in sieve drum apparatus of this type by providing guiding elements which will bear against the veneers being treated and hold them on the drums but which will not block any substantial portions of the surface of the veneers so that they will dry evenly or be treated uniformly. This is advantageously effected by using a plurality of laterally spaced chord elements which are relatively thin and which bear against the veneers at spaced locations and do not interfere with the flow of the treatment fluid.

Summary of the invention

This invention relates in general to a device for treating articles having little permeability with a fluid such as air, and in particular, to a new and useful device for holding and smoothing large area materials having little permeability to air, such as veneers and cardboard webs.

The invention relates to devices for smoothing and holding slightly permeable or impermeable large area materials such as veneers and cardboard webs during a working process, preferably a drying process. The invention has particular application to apparatus of this type using sieve drums subjected to a suction draft which causes a flow of fluid through the perforations of the drums to hold and guide the material to be processed over the surface thereof.

The requirement for more economical and shorter processing and manufacturing procedures makes it essential to have a very quick drying of veneers and similar materials. However, when the veneer is subjected to quick heating, it warps because of its peculiar structure and because of the unavoidable surface tension which will act on the lower surface thereof by the pressure of cutters during a cutting action operation. It is advantageous to dry such materials on sieve drum dryers because the drying process can be shortened owing to the large amount of air which is circulated and because by using several drums in a series, it is possible to subject each surface of the veneer to hot drying air. It has been known to use large size calender rolls for drying veneers in which instance the material to be dried is held to the rolls by rotating strips. Such strips are disadvantageous because they prevent the drying air from circulating in the areas occupied by such strips.

In accordance with the present invention, there is provided a drier or fluid treatment device for veneers and the like which includes a plurality of drums arranged in a series with each being perforated and having means for drawing a treating fluid through the perforations. The drums are arranged and baffles are provided in drums to cause a suction over an area of a first drum in a row which is cut off in the vicinity of the next adjacent drum which has an area of effective suction at such location. In this manner, veneers may be effectively transferred from one drum to the next. According to the invention, the device is provided with guarding or guiding means consisting of preferably narrow parts which do not hinder or which do not impair air circulation and which are arranged in the direction of the material passage.

As a further feature of the invention, the parts serving as guarding or guiding means are advantageously arranged at an angle to the direction of material passage. With such an arrangement the material is evenly dried even at the spots covered by the guarding or guiding means. A further arrangement provides for the guarding or guiding means arranged divergent to the direction of material passage, so that the forces transverse to the direction of the material passage compensate each other.

In still another aspect of the invention, endless cords are employed as guiding or guarding means which move with a speed equal to the speed of the material to be processed. In some cases, the cords are driven and are arranged at a certain distance from each other and tensioned. In order to improve the treatment which is usually drying and smoothing caused by the suction action of the circulating fluid such as air, in some instances means are provided to direct jets against the material or smoothing rollers are provided to act on the material as it is being moved.

It is advantageous when individual rollers or smoothing elements are provided, that there be means for re-tensioning them. Such re-tensioning means can advantageously include eccentric bushings for rotatably supporting the rollers.

A feature of the invention is that perforated drums are employed which include fan elements arranged at one or both sides which create a powerful suction on the perforated periphery thereof. Generally, the veneers and similar large area materials are safely held to the drums by the suction draft only. Therefore, in accordance with the invention, it fully suffices to provide stationary guarding or guiding means which do not touch the material sucked to the drum jacket. Such guarding or guiding means advantageously are adapted to the curvature of the drum and are arranged at a slight spacing from the drum surface. Preferably rails will be employed for such parts which essentially are arranged in a direction of material passage and which consist of sectional material or tubing. If the rails or part of the rails are arranged at an angle to the direction of material passage, this offers the advantage that the warped veneers are at least once pressed against the drum surface as they are moved. Instead of using several rails, it is also possible to use only one rail, especially when short veneers are to be treated, and to arrange the rails approximately in the middle of the drum. In some instances it is desirable to use perforated sheets as the guarding or guiding means instead of the rails. When such sheets are employed, the perforations are made large so that they will not hinder the air penetration.

In a preferred arrangement, the guarding means are mounted so that they may be adjustably positioned in respect to the drum surface in order to accommodate various thicknesses of veneers. In some instances the guiding means are arranged so that the distance between the drum surface and the guiding means becomes progressively smaller in the direction of material passage so that there will be a smoothing action on the treated material. Additionally, the guiding means may be arranged so that the spacing between the guiding means and the drum is less on the sides than it is on the center to lessen the likelihood of jamming when the veneers are unduly warped or of too great a thickness.

In accordance with the invention it has been shown that only the drums which carry and guide the material on their lower surfaces must be provided with guiding means. In general it will even be sufficient if only the first drum is provided with such guarding or guiding means, because after the first two drums drying has advanced to such a degree that the surface tension of the material to be dried has been so much released when it reaches the third and especially the fifth drum, that the ends are not lifted from the drum anymore and the material does not fall off the drum any longer. In a preferred arrangement, the guarding or guiding means extends up to the incoming conveyor for the drying device which advantageously includes a plurality of rotating perforated drums arranged in a series.

Accordingly, it is an object of the invention to provide a drying device for materials which are slightly permeable or impermeable and which includes a plurality of rotatably perforated drums arranged in a row and having fan and baffle means for providing suction through the perforations to the surface of the drum only at certain areas in order to facilitate the transfer of the materials from one drum to the other by the holding action of the suction and wherein the device includes guarding or guiding means associated with one or more drums, preferably the drums carrying the material on the bottom surface thereof for orienting and positioning the material to be treated in respect to the drums at least in the initial stages of treatment.

A further object of the invention is to provide a drum dryer having an inlet conveyor and a plurality of perforated rotatable drums which are adapted to transfer material from the inlet over the drums and to a discharge and which includes a guarding or guiding element arranged adjacent the inlet for facilitating the movement, treatment action and support of the materials to be treated at least as they are direced to the surface of the first drum.

A further object of the invention is to provide guarding and guiding means for association with the perforated drums of a drum drier which advantageously may include rollers or air deflecting devices or nozzles for aiding the holding action and for smoothing the material being treated.

A further object of the invention is to provide a drum drier for veneers and similar semi-permeable material which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 3 is a somewhat schematic transverse sectional view of a holding and smoothing device used in the drier of FIG. 1;

FIG. 4 is a partial bottom plan view of the holding and smoothing device indicated in FIG. 3;

Figure 1:
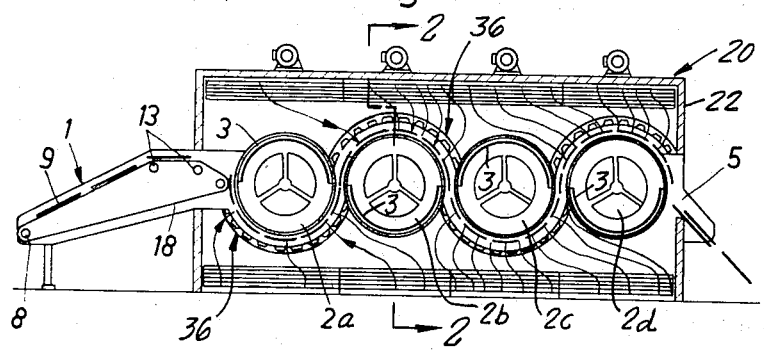
FIG. 1 is a longitudinal section of a sieve drum drier having four sieve drums constructed in accordance with the invention.
Figure 2:
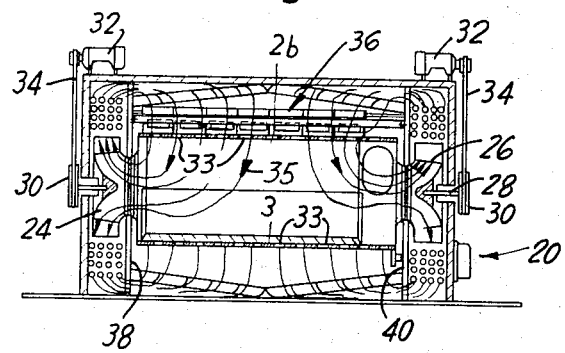
FIG. 2 is a section taken on the line 2—2 of FIG. 1.
Figure 5:
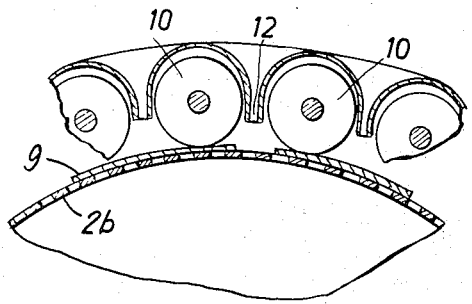
FIG. 5 is a view similar to FIG. 3 of another embodiment of the invention.

Referring to the drawings in particular, the embodiment indicated in FIGS. 1 to 4 comprises a drum drier generally designated 20 which includes a substantially block-shaped housing 22 having an opening at one end which accommodates the discharge end of an inlet conveyor or feeding device generally designated 1. The feeding device 1 includes an endless belt 18 which is trained to run around guide rollers 13 and a tensioning roller 8. The guide rollers 13 are located so that veneers, cardboard or similar materials to be treated indicated at 9 are delivered downwardly against the surface of a first perforated drum 2a of a four drum series including drums 2a, 2b, 2c and 2d, which are arranged side by side for rotation about horizontal axes which lie in the same plane. The last drum 2d is located so that material 9 carried on its surface will be discharged onto a chute 5 defined on the other end of the housing 22.

Each drum 2a, 2b, 2c and 2d includes fan elements 24 and 26 which are either formed integrally therewith or as separate lateral units secured to a drum shaft 28. In the embodiment illustrated, the drum shaft 28 carries a pulley 30 at each end which is driven by a respective motor 32 through a belt 34. When the motors 32, 32 are started, the shaft 28 is rotated to rotate the fans 24 and 26 and the drums 2a, 2b, 2c or 2d to cause a circulation of a drying fluid through perforations 33 which are defined around the complete periphery of the drums. Each drum is provided with a baffle 3 which is adjustable but which is positioned as indicated in FIG. 1 in order to provide for effective suction areas through the perforations at the lowermost portion of the drum 2a, the uppermost portion of drum 2b, the lowermost portion of the drum 2c, and the uppermost portion of the drum 2d, and to cut off the vacuum at the opposite surfaces thereof for facilitating the transfer of the material from one drum to the next by the suction. In the embodiment illustrated, only four drums are provided, but a number greater or lesser than four can be provided in accordance with the treatment desired, including the smoothing or the drying as necessary. When the materials 9 are delivered to the surface of the drum and the drum is rotated, the treatment fluid which is circulated by the fans 24 and 26 causes the materials to adhere to the surface of the drum and the flow patterns of the treatment fluid are indicated generally by the arrows 35.

In accordance with the invention, in order to facilitate the drying of material such as veneers which are not as permeable to air as for example material such as textiles, there is provided guiding and guarding means generally designated 36 which are advantageously associated with each drum but which may for example be associated with only the first drum 2a or the first few drums in a series for facilitating the passage of veneers 9 when they are in a particularly moist condition. As best indicated in FIGS. 3 and 4, the guiding and guarding device 36 includes guiding or deflection rollers 7, 7 which are rotatably mounted on inner side walls 38 and 40 of the housing 22. The mounting is preferably such that the guide rolls may be adjustably positioned in respect to the surfaces of an associated drum 2a, 2b, 2c and 2d for guiding cord or belt elements 6 so that they will press the veneers 9 against the surface of the drum. The cords are advantageously held in grooves 7a (FIG. 4) of the associated rollers in closely spaced relationship across the width of the drum but are of a thickness such that they will not materially interfere with the flow of the treatment air in respect to the articles being treated. The spacing and arrangement is such that the veneers will not become warped or distorted during the drying and smoothing process. The cords are advantageously tensioned by means of a tensioning roller 8 and the cords may be driven either by frictional contact with the associated drum 2a, 2b, 2c, or 2d, or by the roller 8 which is driven from a motor M. In the embodiment illustrated in FIGS. 3 and 4, the motor M and the pulley 8 are mounted on a lever L which is pivoted about a pivot member 42 for the purpose of adjusting the position of tensioning roller 8 for tensioning the cord 6.

The guarding and guiding device 36 also advantageously includes a curved plate element 44 which is carried in the walls 38 and 40 in an adjustable manner and which defines a plurality of nozzle elements 12 which permit the discharge of air in high velocity jet streams downwardly onto the veneer 9 held on the surface of the drum 2a. The curved plate also provides means for rotatably supporting a plurality of individual rollers 10 between the nozzles 12 at a location such that they bear against the veneers 9 on the surface of the drum and have a smoothing action thereon. It is of advantage to cover the rollers 10 with a flexible heat resistant coating, for example with a plastic coating, in order to insure that the material is elastically and uniformly pressed against the drums. In a preferred arrangement, the rollers 10 are mounted on the curved plate 44 so that they will yield slightly and are advantageously biased downwardly against the veneers by spring means (not shown). As indicated in FIG. 4, the rollers 10 advantageously are of a length such that they may be accommodated between the cords 6. The nozzles of adjacent rollers are advantageously arranged in a staggered manner, but any roller or nozzle pattern may be employed in accordance with experience and desired treatment of the articles.

Figure 6:
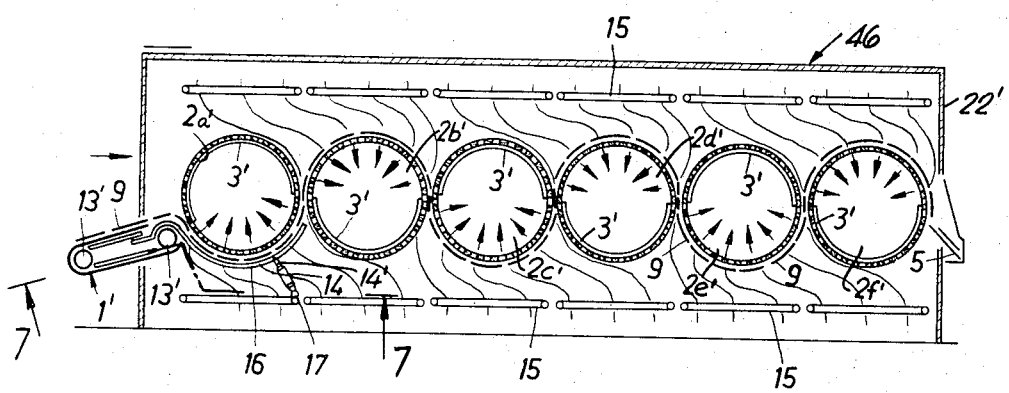
FIG. 6 is a longitudinal sectional view of another embodiment of a sieve drum drier.
Figure 7:
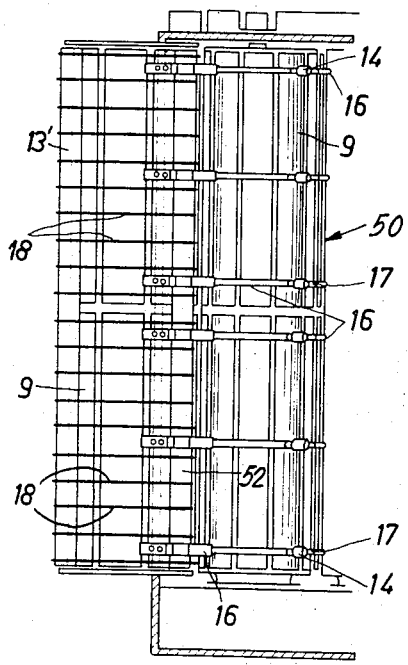
FIG. 7 is a partial sectional view taken along the line 7—7 of FIG. 6.

In the embodiment indicated in FIGS. 6 and 7, similar parts are similarly designated but with primes. In this embodiment, there is provided a drier generally designated 46 which includes a block-shaped housing 22' which is somewhat longer than the housing 22 of the embodiment of FIG. 1. In this embodiment there are six rotatable sieve drums 2a', 2b', 2c', 2d', 2e' and 2f'. Baffles 3' are arranged within the drums in a manner similar to the other embodiment. Individual veneers 9 are fed on a conveying device generally designated 1' which includes guide rollers 13', 13'. Each drum includes fan means (not shown but similar to that indicated in FIG. 2) associated therewith for drawing the treatment fluid through the perforations of a surface thereof, except in the areas having the baffles 3', so that the veneers 9 which are fed in are attracted to the drum.

In accordance with the invention of FIGS. 6 and 7, guarding and guiding means generally designated 50 are provided which includes a plurality of curved rail members 16 which are arranged across the length of the underside of at least a first drum 2a' in a position so that they insure that the veneers 9 do not fall downwardly onto heating tubes 15 located in the bottom of the housing 22'. The heating tubes 15 are also located at spaced locations across the top of the housing. The distance between the rails is such that the veneers 9 which are sucked to the drum by the vacuum which is created by the fans normally do not touch the rail 16. In the event that the veneers 9 are slightly warped across the edges or the warped portions they will touch the rail 16, and thus be prevented from further lifting away from the drum surface. In some instances, the rails are arranged so that they are directed toward the surface of a drum in a manner so that the distance between the rails and the drum becomes smaller in the direction of the material passage. In such event the warped veneers are gradually strengthened, that is smoothed, and thus they will perfectly adhere to the drum jacket again. Practical experience has shown that the individual veneers, after they have passed the first two drums 2a' and 2b', will be dried to such a degree that the tension decreases so that the suction draft of the third drum 2c' and the remaining drums 2d', 2e' and 2f' will carry the veneers on the surface safely without the guarding or guiding means 50 being required. In most instances the guarding or guiding means are not required on the upper surfaces of the drums, and therefore the drums 2b', 2d' and 2f' would not need the same. In the embodiment illustrated, the guarding or guiding means 50 are only arranged below the drum 2a' which is the first drum in the series.

As indicated in FIG. 7, it is possible to dry two veneers 9 arranged side by side and in such event, the driers usually have a working width of about 5 meters. Of course, when the veneer elements are shorter, only part of the drum will be covered. When parts of the drums are not covered, the suction power is weakened so that the danger that the ends of the veneers will be lifted from the drum and fall off the drum is increased. With the drier according to the invention, it is, however, possible for the first time to process veneers of different length without disturbance, that is, falling off.

The guarding or guiding means 50 is advantageously made of a tubing which is flattened at the inlet side and accommodated in annular grooves of rollers 13', 13' of the feeding device 1'. The ends of the tubes which are flattened will lie below the veneers 9 fed to the drier. The opposite ends, that is away from the conveyor 1', are supported by cylinders 14 which carry adjustable rod elements 14' which may be moved within the tube for adjusting the ends of the guarding and guiding means 50. In the embodiment indicated, the guarding and guiding device 50 can be adjusted in respect to the surface of the drum 2a' only at the end which is adjacent to the drum 2b', but, of course, the opposite end may have servo adjustment means, as required in accordance with operating conditions. The tube elements 16 which form the supporting rails may advantageously be made with two sections, with one being telescopic within the other under pressure in order to accommodate for changes in thickness and warping of the individual veneers.

In the embodiment illustrated, the feeding device 1' advantageously includes rollers 52 over which endless strips 18 which are tensioned by a tension roller (not shown) as in the embodiment of FIG. 3.

While specific embodiments of the invention have been shown and described in detail to illustrate the application of the inventive principles, it will be understood that the invention may be embodied otherwise without departing from such principles.

What is claimed is:

1. A device for treating materials which are air impermeable such as veneers, comprising a plurality of drums rotatably mounted in a row with each drum in a row being arranged adjacent the next successive drum in a position for receiving materials to be treated from the surface of the previous drum, each drum having a perforated curved surface and having fan means associated therewith for pulling a treatment fluid through the perforations and for urging materials to be treated to adhere to the surface of the drum overlying the perforations by the movement of the treatment fluid, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such location, means for directing material to be treated to the first drum in a series for subsequent transfer over a portion of the surface of each drum in a row, discharge means in said housing for receiving the material from the last drum when directing it out of the housing, and guarding and guiding means bearing downwardly over all of said drums in the entire areas having the exposed perforations including a plurality of laterally spaced thin guiding elements bearing on the veneers to hold them adjacent the exterior periphery of said drum for maintaining a material to be treated in association with the drum and extending around the periphery of said drum in spaced relationship thereto and permitting free access of the treatment fluid to the veneer surface whereby the treatment can be uniformly effected.

2. A device for drying materials which are air impermeable such as veneers, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling drying air through the perforations and for urging material to be treated to adhere to the surface of the drum overlying the perforations by the movement of the drying air, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such location, inlet means in said housing for directing material to be treated to the first drum in a series for subsequent transfer over a portion of the surface of each drum in a row, discharge means in said housing for receiving the material from the last drum when directing it out of the housing, and guarding and guiding means associated with at least one of said drums including a plurality of laterally spaced thin guiding elements bearing on the veneers to hold them adjacent the exterior periphery of said drum for maintaining a material to be treated in association with the drum and extending around the periphery of said drum in spaced relationship thereto and permitting free access of the treatment fluid to the veneer surface whereby the treatment can be uniformly effected, and including a plate member having nozzle openings defined therethrough.

3. A device for drying materials which are air impermeable veneers, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a drying air through the perforations and for urging materials to be treated to adhere to the surface of the drum overlying the perforations by the movement of the drying air, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such location, inlet means in said housing for directing material to be treated to the first drum in a series for subsequent transfer over a portion of the surface of each drum in a row, discharge means in said housing for receiving the material from the last drum when directing it out of the housing, and guarding and guiding means associated with at least one of said drums including a plurality of laterally spaced thin guiding elements bearing on the veneers to hold them adjacent the exterior periphery of said drum for maintaining a material to be treated in association with the drum and permitting free access of the treatment fluid to the veneer surface whereby the treatment can be uniformly effected and including a curved member extending around the periphery of said drum at the location at which said perforations are active and being spaced from said drum to permit material to be fed between said curved member and said drum, means for securing said curved member adjacent the inlet of said housing for receiving materials fed into said inlet and for holding the materials between said drum and said curved member as they are moved by said drum from said inlet.

4. A device for drying materials which are air impermeable such as veneers, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a treatment fluid through the perforations and for urging materials to be treated to adhere to the surface of the drum overlying the perforations by the movement of the treatment fluid, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such location, inlet means in said housing for directing material to be treated to the first drum in a series for subsequent transfer over a portion of the surface of each drum in a row, discharge means in said housing for receiving the material from the last drum when directing it out of the housing, and guarding and guiding means associated with at least one of said drums including a plurality of laterally spaced thin guiding elements bearing on the veneers to hold them adjacent the exterior periphery of said drum for maintaining a material to be treated in association with the drum including a curved member carrying said elements and extending around the periphery of said drum at the location at which said perforations are active and being spaced from said drum to permit material to be fed between said curved member and said drum, means for securing said curved member adjacent the inlet of said housing for receiving materials fed into said inlet and for holding the materials between said drum and said curved member as they are moved by said drum from said inlet, and means connected to the end of said curved member opposite from said inlet for adjustably positioning said curved member in respect to the surface of said drum.

5. A device for treating materials which are air impermeable such as veneers, comprising a housing, a plurality of drums rotatably mounted within said housing with each drum in a row being arranged adjacent the next successive drum in a position for receiving materials to be treated from the surface of the previous drum, each drum having a perforated curved surface and having fan means associated therewith for pulling a treatment fluid through the perforations and for urging materials to be treated to adhere to the surface of the drum overlying the perforations by the movement of the treatment fluid, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such locations, inlet means in said housing for directing material to be treated to the first drum in a series for subsequent transfer over a portion of the surface of each drum in a row, discharge means in said housing for receiving the material from the last drum when directing it out of the housing, and guarding and guiding means associated with at least one of said drums including a plurality of laterally spaced thin guiding elements bearing on the veneers to hold them adjacent the exterior periphery of said drum for maintaining a material to be treated in association with the drum including first and second guide rollers arranged at spaced locations and overlying said drum at spaced circumferential positions, said guiding elements comprising endless belts trained to run around said guide rollers, a tensioning roller, means for mounting said tensioning roller to engage said endless belts for tensioning said endless belts and motor means driving said tensioning roller for moving said belts, and a curved plate carried in said housing and overlying said drum between said guide rollers, said plate having nozzle-shaped openings defined therethrough, and a plurality of rollers rotatably mounted between said nozzle openings in a position to bear against the material fed on the surface of said drum and below said belt.

6. A device for treating materials which are air impermeable such as veneers, comprising a housing, a plurality of drums rotatably mounted within said housing with each drum in a row being arranged adjacent the next successive drum in a position for receiving materials to be treated from the surface of the previous drum, each drum having a perforated curved surface and having fan means associated therewith for pulling a treatment fluid through the perforations and for urging materials to be treated to adhere to the surface of the drum overlying the perforations by the movement of the treatment fluid, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such locations, inlet means in said housing for directing material to be treated to the first drum in a series for subsequent transfer over a portion of the surface of each drum in a row, discharge means in said housing for receiving the material from the last drum when directing it out of the housing, and guarding and guiding means associated with at least one of said drums including a plurality of laterally spaced thin guiding elements bearing on the veneers to hold them adjacent the exterior periphery of said drum for maintaining a material to be treated in association with the drum, first and second guide rollers arranged at spaced locations and overlying said drum at spaced circumferential positions, said elements comprising endless belts being trained to run around said guide rollers, a tensioning roller, means for mounting said tensioning roller to engage said endless belt for tensioning said endless belts and motor means driving said tensioning roller for moving said belt, and a curved plate carried in said housing and overlying said drum between said guide rollers, said plate having nozzle-shaped openings defined therethrough, and a plurality of rollers rotatably mounted between said nozzle openings in a position to bear against the material fed on the surface of said drum and below said belt, said guiding member including a plurality of rail members located at spaced transverse locations beneath said drum.

7. A device for treating materials slightly air permeable or impermeable such as veneers, cardboard and the like, comprising a housing, a plurality of drums rotatably mounted within said housing with each drum in a row being arranged adjacent the next successive drum in a position for receiving materials to be dried from the surface of the previous drum, each drum having a perforated curved surface and having fan means associated therewith for pulling a treatment fluid through the perforations and for urging materials to be treated to adhere to the surface of the drum overlying the perforations by the movement of the treatment fluid, fixed baffle means inside each of said drums closing off the perforations over a portion of the interior periphery of the drum, adjacent drums in a row having said baffle means located in a complementary opposite manner to cover lower and upper portions of successive drums in a row so that the material to be treated will be carried on the surface of the drum and will be lifted from one drum to the next by action of said baffle means to discontinue the inflow of treatment fluid through the perforations of one drum as the material approaches the next drum, said next drum having said baffle means located to cause the inflow of treatment fluid at the location of the first drum and thereby to urge the material to the next drum and the transfer of material from the first drum to the next drum in succession at such locations, inlet means in said housing for directing material to be treated to the first drum in a series for subsequent transfer over a portion of the surface of each drum in a row, discharge means in said housing for receiving the material from the last drum when directing it out of the housing, and guarding and guiding means associated with at least one of said drums including a guiding element adjacent the exterior periphery of said drum for maintaining a material to be treated in association with the drum including first and second guide rollers arranged at spaced locations and overlying said drum at spaced circumferential positions, a plurality of laterally spaced endless belts trained to run around said guide rollers, a tensioning roller, means for mounting said tensioning roller to engage said endless belts for tensioning said endless belts as they are directed around said guide roller, and motor means driving said tensioning roller for moving said belts, and a curved plate carried in said housing and overlying said drum between said guide rollers, said plate having nozzle-shaped openings defined therethrough and a plurality of rollers rotatably mounted between said nozzle openings and between said belts in a position to bear against the material fed on the surface of said drum and below said belts, said belts comprising narrow elements which do not materially hinder the treatment fluid flow and which are arranged so that they converge toward said drum in the direction of material flow movement on said drum.

8. A device according to claim 7, wherein said guarding and guiding means includes a relatively thin rail member.

References Cited

UNITED STATES PATENTS

| | | | |
|---|---|---|---|
| 1,301,532 | 4/1919 | Allen | 34—123 X |
| 1,669,552 | 5/1928 | Brunk | 34—123 |
| 1,880,005 | 9/1932 | Wright et al. | 34—110 |
| 2,753,766 | 7/1956 | Simpson | 34—115 |
| 3,052,991 | 9/1962 | Goldner | 34—114 |

FOREIGN PATENTS

| | | |
|---|---|---|
| 846,767 | 6/1939 | France. |
| 647,772 | 7/1937 | Germany. |
| 942,578 | 11/1963 | Great Britain. |
| 571,367 | 1/1958 | Italy. |

FREDERICK L. MATTESON, JR., *Primary Examiner.*

A. D. HERRMANN, *Assistant Examiner.*